(12) United States Patent
Bienzobas Saffie

(10) Patent No.: US 10,329,691 B2
(45) Date of Patent: Jun. 25, 2019

(54) SYSTEM AND METHOD FOR GENERATING AN IMAGE IN A THREE-DIMENSIONALLY PRINTED OBJECT

(71) Applicant: Fernando Andres Bienzobas Saffie, Santiago (CL)

(72) Inventor: Fernando Andres Bienzobas Saffie, Santiago (CL)

( * ) Notice: Subject to any disclaimer, the term of this patent is extended or adjusted under 35 U.S.C. 154(b) by 316 days.

(21) Appl. No.: 14/684,126

(22) Filed: Apr. 10, 2015

(65) Prior Publication Data

US 2016/0229122 A1    Aug. 11, 2016

Related U.S. Application Data

(60) Provisional application No. 62/113,280, filed on Feb. 6, 2015.

(51) Int. Cl.
| | |
|---|---|
| *D01D 5/00* | (2006.01) |
| *G05B 19/4099* | (2006.01) |
| *B29C 64/209* | (2017.01) |
| *B29C 64/118* | (2017.01) |
| *B33Y 10/00* | (2015.01) |
| *B33Y 30/00* | (2015.01) |

(Continued)

(52) U.S. Cl.
CPC .............. *D01D 5/00* (2013.01); *B29C 64/118* (2017.08); *B29C 64/209* (2017.08); *G05B 19/4099* (2013.01); *B29C 64/386* (2017.08); *B29K 2105/0032* (2013.01); *B33Y 10/00* (2014.12); *B33Y 30/00* (2014.12); *B33Y 50/02* (2014.12); *B33Y 80/00* (2014.12); *G05B 2219/35134* (2013.01); *G05B 2219/49007* (2013.01); *Y02P 90/265* (2015.11)

(58) Field of Classification Search
CPC .................................................... B29C 64/141
See application file for complete search history.

(56) References Cited

U.S. PATENT DOCUMENTS

| 4,614,953 A | 9/1986 | Lapeyre |
|---|---|---|
| 6,372,164 B1 | 4/2002 | Bennett et al. |

(Continued)

FOREIGN PATENT DOCUMENTS

| KR | 20130060144 A | 6/2013 |
|---|---|---|
| WO | WO 2004/093568 B1 | 9/2005 |

(Continued)

OTHER PUBLICATIONS http://spectrom3d.com/.
http://botobjects.com/.

*Primary Examiner* — Robert A Vetere
(74) *Attorney, Agent, or Firm* — Orrick, Herrington & Sutcliffe LLP

(57) ABSTRACT

A system for generating three dimensional objects that include an image, and methods for manufacturing and using same. Some embodiments include an elongated line for generating a three dimensional object via additive manufacturing having an image defined by a pixel array, where the line includes a plurality of discrete pixels disposed along the length of the line, the pixels configured to generate the pixel array. Other embodiments include an extruder system configured to extrude a line. Further embodiments include a method of generating a three dimensional object via additive manufacturing having an image defined by a pixel array.

4 Claims, 11 Drawing Sheets

(51) Int. Cl.
    *B33Y 50/02*     (2015.01)
    *B33Y 80/00*     (2015.01)
    *B29K 105/00*     (2006.01)
    *B29C 64/386*     (2017.01)

(56) References Cited

U.S. PATENT DOCUMENTS

| | | |
|---|---|---|
| 6,561,783 B2 | 5/2003 | Hsu |
| 6,652,256 B2 | 11/2003 | Coe |
| 6,823,794 B2 | 11/2004 | Bosler |
| 8,142,860 B2 | 3/2012 | Vanmaele et al. |
| 8,197,733 B2 | 6/2012 | Sudano |
| 8,282,197 B2 | 10/2012 | Voeght et al. |
| 2007/0228597 A1 | 10/2007 | Mutton et al. |
| 2013/0069267 A1 | 3/2013 | Liu et al. |
| 2013/0208066 A1* | 8/2013 | Bienzobas Saffie ..... B41M 3/00 347/110 |
| 2013/0304009 A1 | 11/2013 | Wang et al. |
| 2013/0328228 A1 | 12/2013 | Pettis et al. |
| 2014/0034214 A1 | 2/2014 | Boyer et al. |
| 2014/0079841 A1* | 3/2014 | Pridoehl ................... B29B 7/94 425/375 |
| 2014/0088751 A1 | 3/2014 | Pridoehl et al. |
| 2014/0134335 A1* | 5/2014 | Pridoehl ............. B29C 67/0055 427/256 |
| 2014/0234608 A1 | 8/2014 | Kohlert et al. |
| 2015/0142153 A1* | 5/2015 | Chun .................. B29C 67/0088 700/98 |
| 2015/0231829 A1* | 8/2015 | Haider .................. B33Y 30/00 700/119 |
| 2015/0343704 A1 | 12/2015 | Stahl et al. |

FOREIGN PATENT DOCUMENTS

| | | |
|---|---|---|
| WO | WO 2013/044544 A1 | 4/2013 |
| WO | WO 2013/143659 A1 | 10/2013 |
| WO | WO 2015/156877 A2 | 10/2015 |

\* cited by examiner

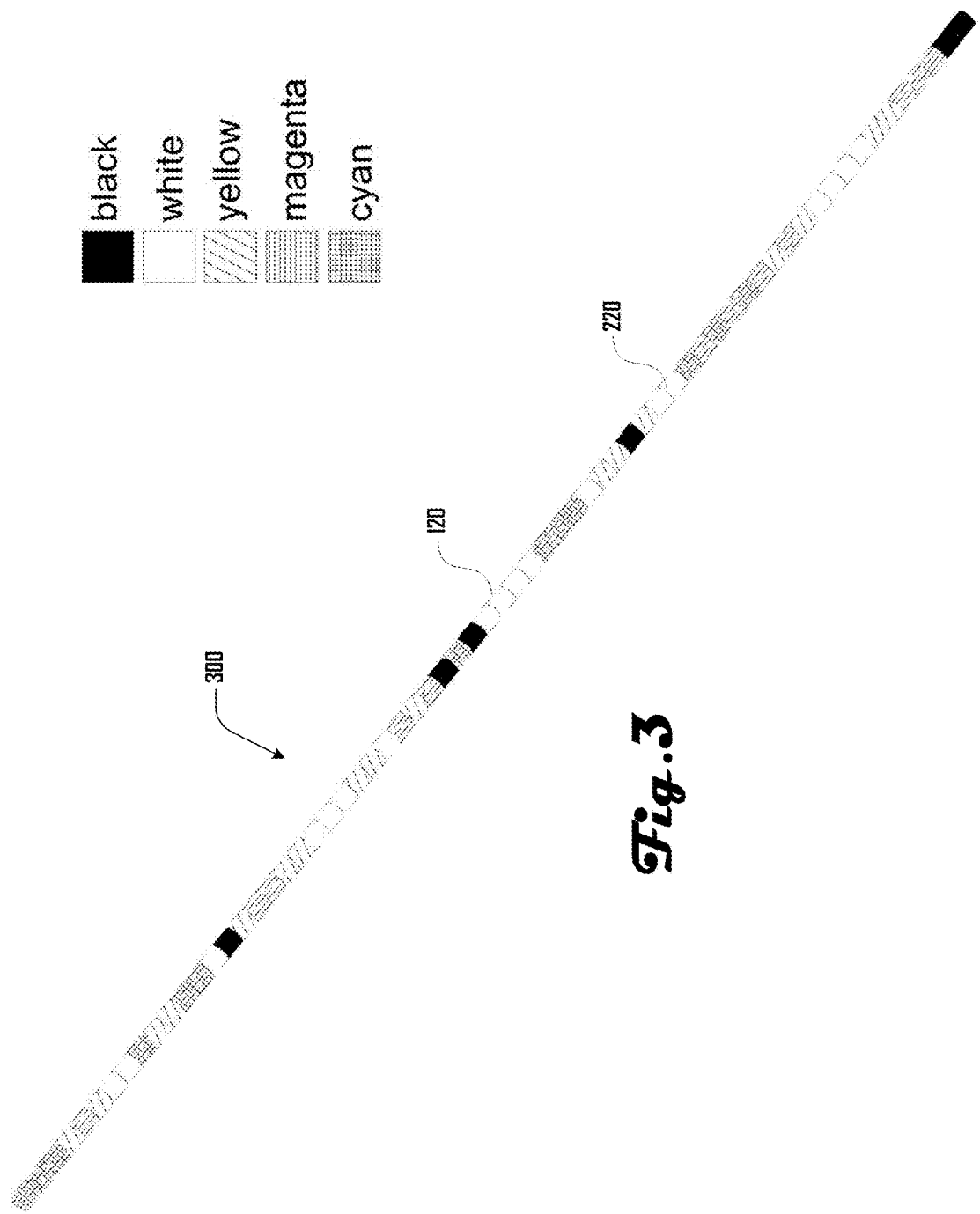

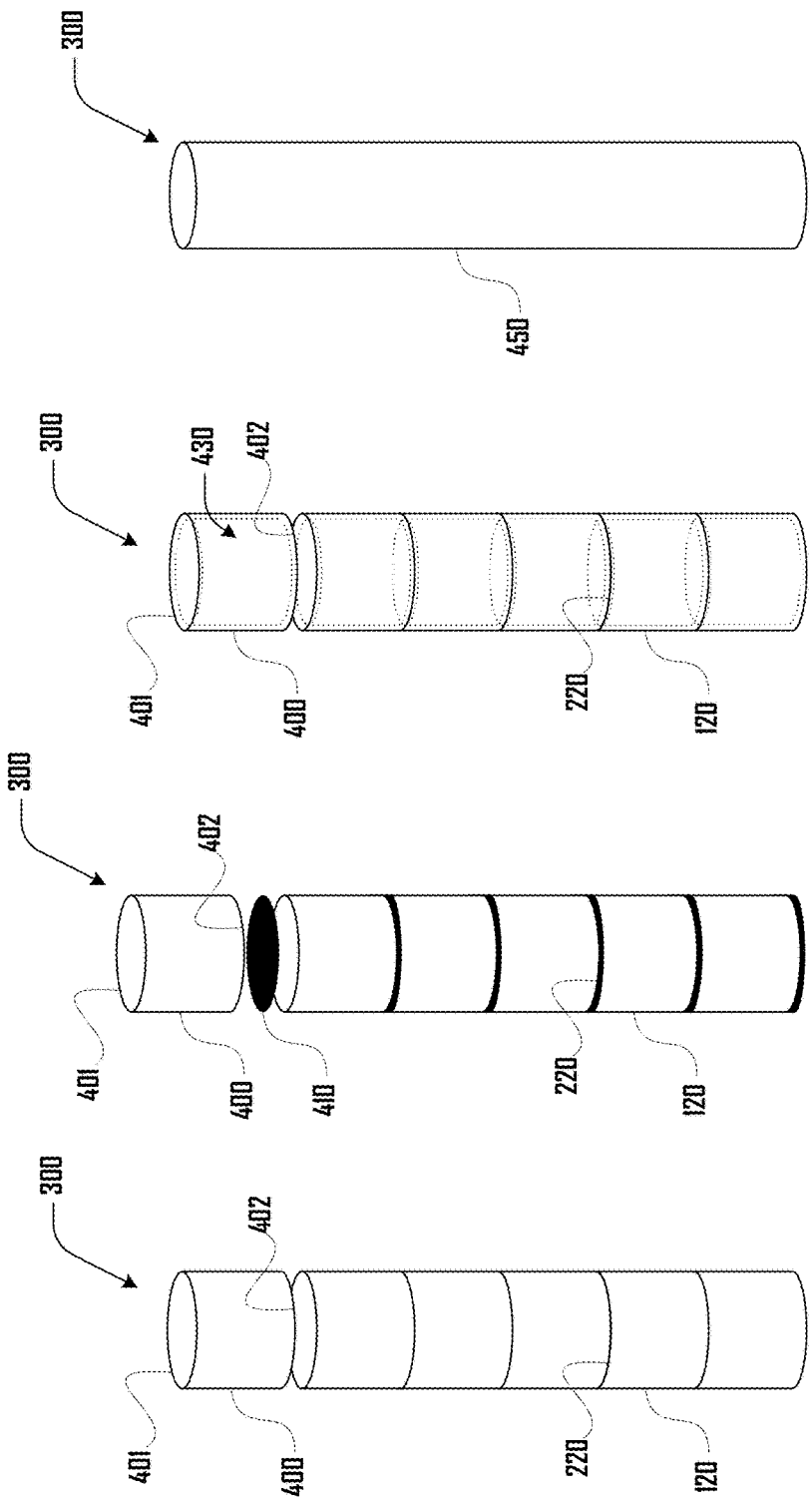

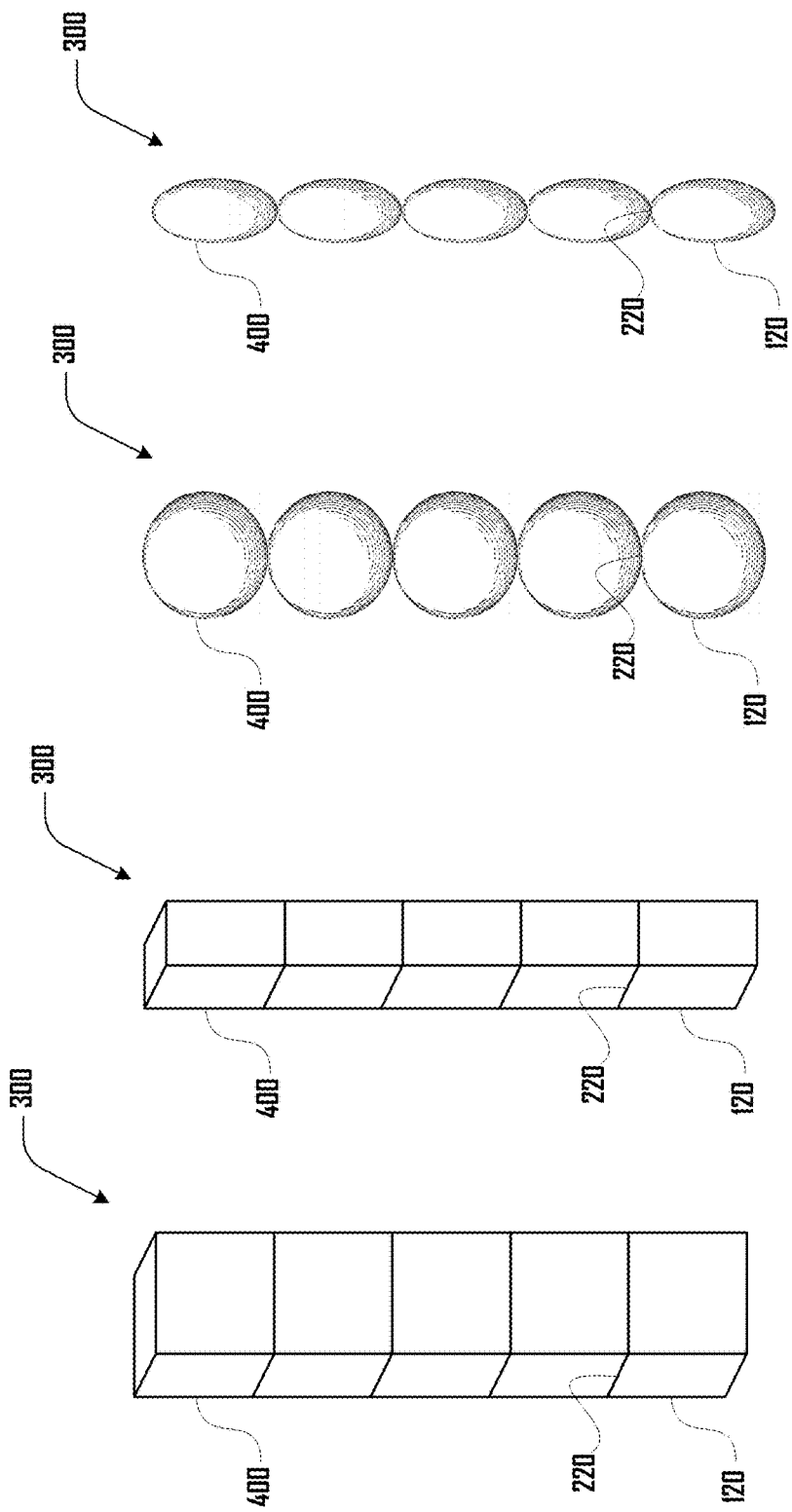

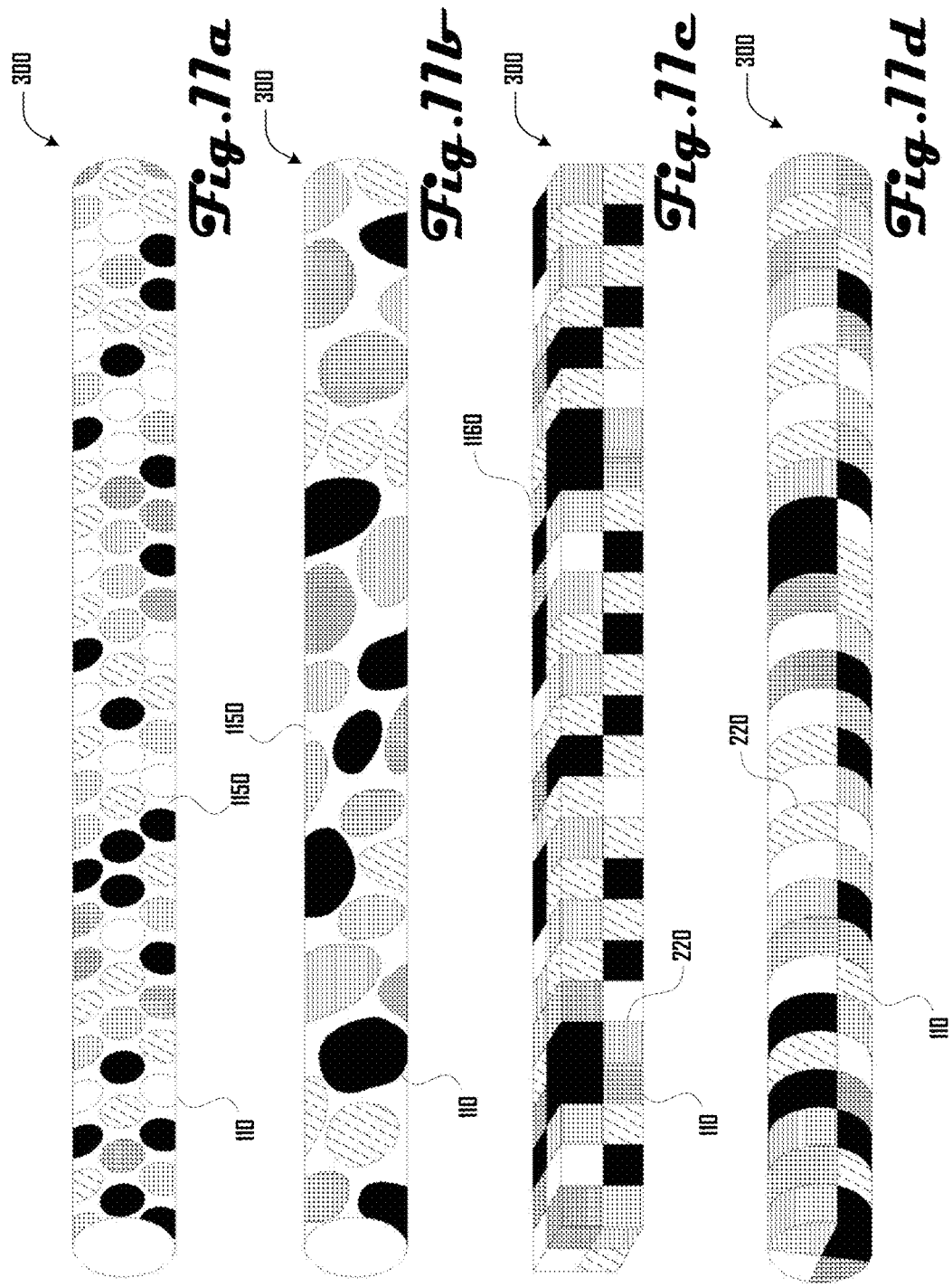

SYSTEM AND METHOD FOR GENERATING AN IMAGE IN A THREE-DIMENSIONALLY PRINTED OBJECT

CROSS-REFERENCE TO RELATED APPLICATIONS

This application is a non-provisional of, and claims the benefit of, U.S. Provisional Application No. 62/113,280, filed Feb. 6, 2015, which application is hereby incorporated herein by reference in its entirety for all purposes.

BACKGROUND

In the field of additive manufacturing and three-dimensional (3D) printing, a conventional system includes depositing an extrusion on a surface or plane (2D) in order to "draw" layers of a three dimensional object being printed. Layer upon layer of the object is built until the object is complete. Such hardware receives instructions from 3D imaging software, similar to those used by architects and design engineers, with the additional feature that the software "slices" the parameters of the object to print, and sends instructions about each layer to a CNC (Computerized Numeric Control) machine that moves in two axes while depositing the material that "draws" each layer. After each layer is completed, the machine deposits the next layer on top of the prior layer. This process continues until the three-dimensional object is completed.

Some existing systems may only create monochromatic objects. Other existing systems are capable of creating objects with more than one color (and/or a grayscale pattern), but these systems suffer from various drawbacks. Accordingly, a need exists for a new system and method for generating images in three dimensional objects.

BRIEF DESCRIPTION OF THE DRAWINGS

FIG. 3 is an exemplary drawing illustrating an embodiment of a line of or having colored pixels.

FIGS. 4a-d illustrate example embodiments of the line of FIG. 3.

FIGS. 5a-d illustrate lines in accordance with further embodiments.

FIG. 7a illustrates a side view and zoom view of an embodiment of a line extruder that comprises an inkjet printing assembly.

FIG. 7b illustrates a zoom view of the line inkjet assembly of FIG. 7a.

FIG. 8a illustrates a side view and zoom view of an embodiment of a line extruder that comprises an inkjet printing assembly.

FIG. 8b illustrates a zoom view of the inkjet assembly of FIG. 8a.

FIGS. 11a-d illustrate further example embodiments of a line of or having colored pixels.

Figure 1A:
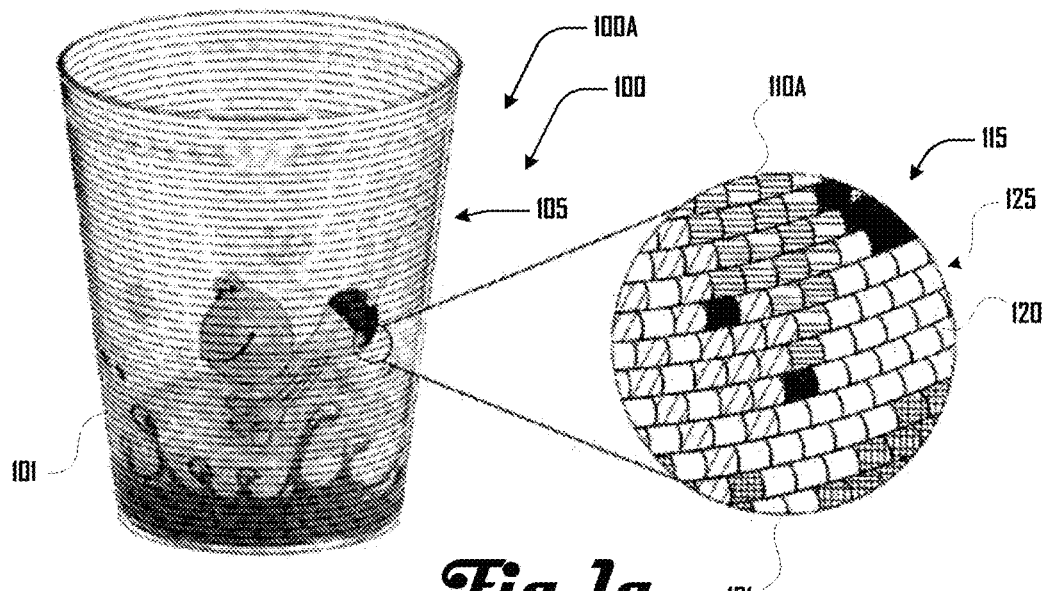
FIG. 1a is an exemplary perspective and zoom drawing illustrating an embodiment of a three dimensional object that includes an image defined by a pixel array.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available additive manufacturing and 3D printing systems are deficient in creating images in three dimensional objects, a new system and method for generating images in three dimensional objects can prove desirable and provide a basis for a wide range of applications, such as generating color images in three dimensional objects.

For example, various embodiments described herein comprise generating a line having a plurality of color segments (referred to as "pixels") and then arranging the line in a pattern that, when deposited, generates a pixel array that matches an image. However, unlike two-dimensional digital images that are defined by a planar array of color pixels, various embodiments described herein can leverage 3D printing techniques to generate images on and/or within printed three dimensional objects. In other words, by selectively depositing a pixelated line in layers to form a three dimensional object, the three dimensional object can comprise a desired image.

FIG. 1a illustrates an example of a printed object 100A (a cup) that comprises an image 105 on an outer surface 101 of the object 100A. As illustrated in zoomed view 110A, the image 105 is defined by a pixel array 115 that comprises a plurality of colored pixels 120 that are disposed in rows 125. In various embodiments, the rows 125 can comprise parallel portions or segments of a line 300 (e.g., as shown in FIG. 3 and described in detail herein).

Figure 1B:
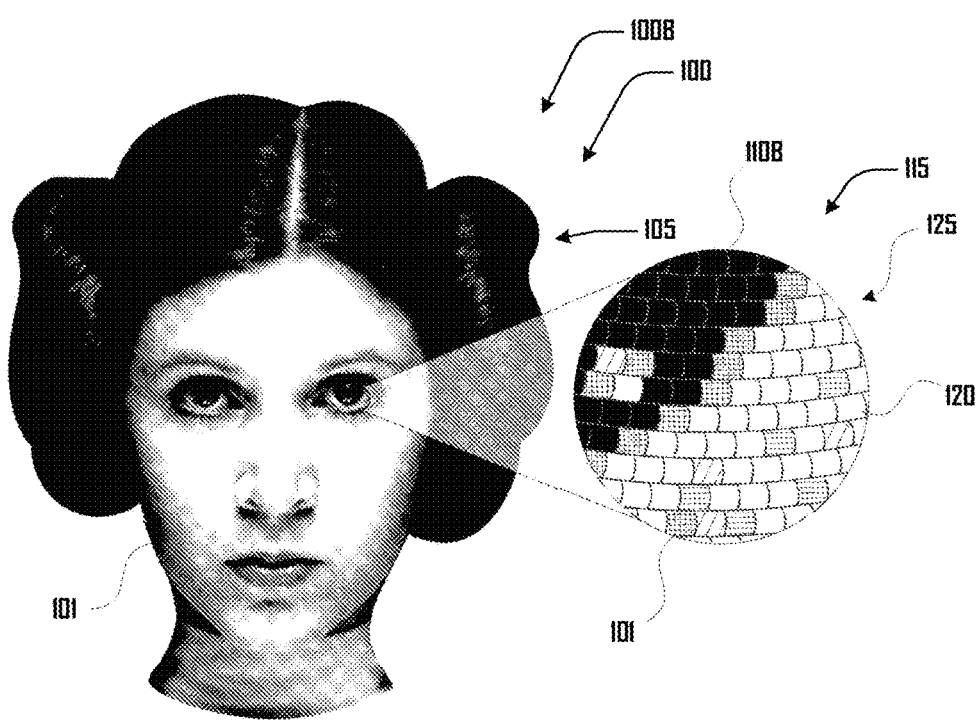
FIG. 1b is an exemplary perspective and zoom drawing illustrating another embodiment of a three dimensional object that includes an image defined by a pixel array.

FIG. 1b illustrates another example of a printed object 100B (a doll's head) that comprises an image 105 on an outer surface 101 of the object 100B. As illustrated in zoomed view 110B, the image 105 is defined by a pixel array 115 that comprises a plurality of colored pixels 120 that are disposed in rows 125. In various embodiments, the rows 125 can comprise parallel portions or segments of a line 300 (e.g., shown in FIG. 3 and described in detail herein).

Although various embodiments discussed herein can relate to a pixel array 115 that comprises a plurality of colored pixels 120, further embodiments can include any suitable imaging method, including black and white, grayscale, and the like. Additionally, any suitable color model method can be used including CMYK (cyan, magenta, yellow, black); RGB (red, green, blue); the Munsell Color System; HSB (hue, saturation, brightness); HLS (hue, lightness, saturation); indexed color; LAB (lightness, redness/greenness, yellowness/blueness); Natural Color System (NCS); halftone coloring; duotone, or the like. Additionally, any suitable pigments, colorings, or textures can be used in various embodiments. For example, metals such as chrome, silver, gold, and the like can be present in a pixel 120. Accordingly, it should be clear that any example embodiments described herein are not limiting on the many alternative embodiments that are within the scope and spirit of the present invention.

Figure 2A:
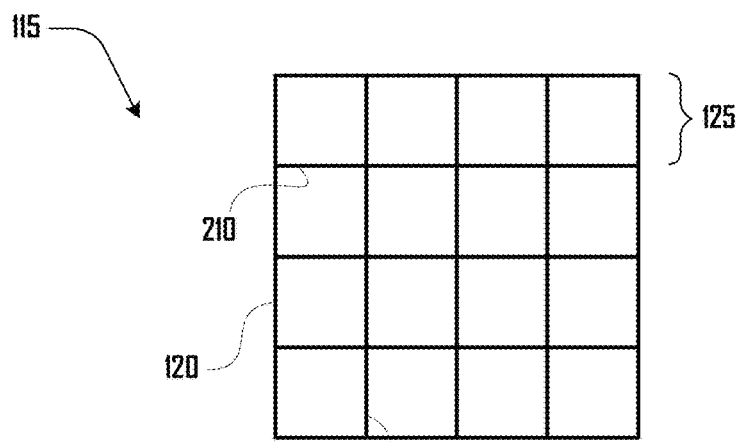
FIGS. 2a-c are exemplary drawings illustrating example embodiments of a pixel array.
Figure 2B:
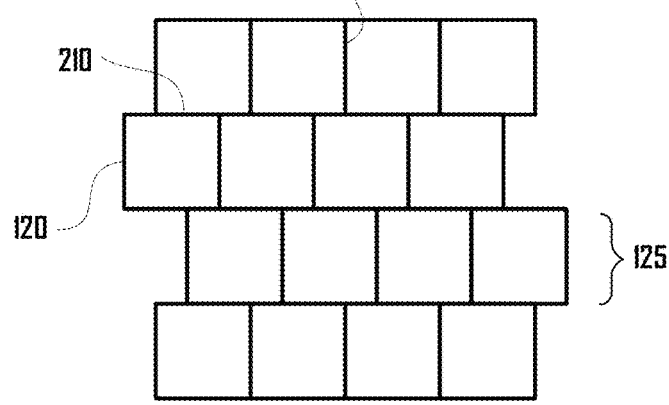
Figure 2C:
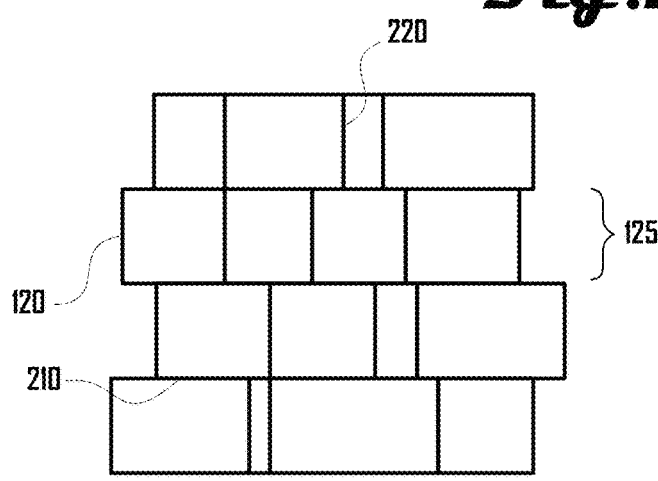

A pixel array 115 can be configured in various suitable ways and FIGS. 2a-c illustrate three example embodiments of a pixel array 115. FIG. 2a-c illustrate a pixel array 115 comprising a plurality of pixels 120 that are disposed in a plurality of rows 125. The rows 125 are separated by a row boundary 210, and each of the pixels 120 is separated by pixel boundary 220 within the rows 125.

In the embodiment of FIG. 2a, the pixels 120 are of uniform size and the pixel boundaries 220 are shown in an aligned configuration. In the embodiment of FIG. 2b, the pixels 120 are of uniform size and the pixel boundaries 220 are shown in an offset configuration. In the embodiment of FIG. 2c, the pixels 120 are of non-uniform size and the pixel boundaries 220 are shown in aligned and offset configurations.

Accordingly, in various embodiments, the pixels 120 of a pixel array 115 can be of uniform or non-uniform size and pixel boundaries 220 between rows 125 can be aligned and/or offset. In some embodiments, pixels 120 can be non-uniform, with a limited number of sizes. For example, pixels 120 can be of two sizes—large and small. In such embodiments, large and small pixels 120 can be arranged in a pattern or can be in a randomized or non-uniform configuration.

Additionally, although some embodiments illustrate pixels 120 of an array 115 arranged in rows 125, further embodiments can comprise pixels 120 arranged in columns. In further embodiments, a row or column arrangement can be absent, and pixels can be packed in any other suitable uniform, non-uniform, or patterned arrangement.

Rows 125 of a pixel array 115 can be defined in various suitable ways. For example, FIG. 3 illustrates a line 300 that comprises a plurality of pixels 120 that are separated by respective pixel boundaries 220. In this non-limiting example, the pixels 120 comprise the colors black, white, yellow, magenta and cyan.

Although FIG. 3 illustrates one embodiment of a line 300 where pixels 120 span the full width or circumference of the line 300, in further embodiments, pixels 120 do not span the full width or circumference of the line 300. For example, pixels 110 can comprise colored portions around the width or circumference of the line 300.

FIG. 11a illustrates an embodiment wherein circular pixels 110, are disposed uniformly around the circumference of a cylindrical line 300, with the pixels 120 being set on a background 1150. Although FIG. 11a illustrates circular pixels 110 in an offset pattern, this arrangement is only one of many possible embodiments that are within the scope and spirit of the present invention. For example, pixels 110 can be arranged in any suitable pattern (e.g., aligned, offset, or the like) and can define one or more shape including, a circle, oval, square, triangle, rectangle, or the like. In various embodiments, software can generate any suitable arrangement of pixels 110 which are described herein or are within the scope and spirit of the invention. FIG. 11b illustrates an embodiment wherein pixels 110 of non-uniform size and shape, are disposed non-uniformly around the circumference of a cylindrical line 300, with the pixels 120 being set on a background 1150.

FIG. 11c illustrates an embodiment of a rectangular line 300 having a plurality of pixels 110 around the width of the line 300. In this example embodiment, pixels 110 span both sides of edges 1160 of the line 300 with four pixels 110 being disposed around a given width of the line 300 in respective rows separated by boundaries 120. FIG. 11d illustrates another example embodiment of a cylindrical line 300 having a plurality of pixels 110 around the circumference of the line 300. In this example embodiment, there are four pixels disposed around a given circumference of the line 300 in respective rows separated by boundaries 120.

The line 300 can be configured in various suitable ways. For example, FIG. 4a illustrates one embodiment of a line 300 that comprises a plurality pixels 120 separated by pixel boundaries 220, where each pixel 120 is defined by a pixel body 400 and the pixel boundaries 120 are defined by the coupling of respective top and bottom ends 401, 402 of adjoining pixel bodies 400.

FIG. 4b illustrates another embodiment of a line 300 that comprises a plurality pixels 120 separated by pixel boundaries 220, where each pixel 120 is defined by a pixel body 400. The pixel boundaries 120 are defined by a boundary body 410 that resides between respective top and bottom ends 401, 402 of adjoining pixel bodies 400.

In some embodiments, the boundary body 410 can comprise the same material as a pixel body 400, but in some embodiments, the boundary body 410 can comprise different materials than the pixel body 400. In some embodiments, the boundary body can be a liquid that hardens into a solid or can be a solid body that is inserted between respective pixel bodies 400. Additionally, although the boundary body 410 is shown as being darker than the pixel bodies 400, in various embodiments, a boundary body 410 can be any suitable color or can be transparent, translucent, or the like. Furthermore, although various embodiments described herein relate to discrete pixels, further embodiments can comprise pixels having boundaries that are diffuse, a gradient, blurred, transitional, or the like.

FIG. 4c illustrates a further embodiment of a line 300 that comprises a plurality pixels 120 separated by pixel boundaries 220, where each pixel 120 is defined by a pixel body 400 and the pixel boundaries 120 are defined by the coupling of respective top and bottom ends 401, 402 of adjoining pixel bodies 400. The pixel bodies 400 also comprise a cavity 430 defined by the pixel body.

Such a cavity 430 can be any suitable size or shape in accordance with various embodiments. In some embodiments, the cavity 430 can be completely internal to the pixel body 400, but in further embodiments, the pixel body 400 can comprise one or more orifice (not shown) that provides a passage into and out of the cavity 430.

As described in more detail herein, in various embodiments, the line 300 can be colored by disposing coloring (e.g., a fluid, solid, powder, or the like) into the cavity 430. In some embodiments, coloring can be introduced via one or more orifice (not shown) defined by the pixel body 400 and in some embodiments, the pixel body 400 can be punctured and coloring can be added to the cavity 430 via the puncture (e.g., coloring can be injected into the cavity 430).

FIGS. 4a-c illustrate embodiments where a line 300 comprises a plurality of discrete pixel bodies 400 that can be coupled to generate a contiguous line 300. Coupling of pixel bodies 400 can be achieved in any suitable way, including an adhesive, welding, a boundary body 410, or the like. In further embodiments, pixel bodies 400 can be coupled via magnets, corresponding coupling structures (e.g., a friction fit, tongue-and-groove, hook-and-loop, or the like), one or more string or filament that runs through or around the plurality of pixel bodies 400, an outer casing, or any other suitable coupling method or structure.

In contrast, in some embodiments, a line 300 can comprise a continuous body 450 as illustrated in FIG. 4d. In such an embodiment, portions of the body 450 can be colored in various suitable ways as described herein, including ink jet printing, dyeing, elechtrochromia, photochromia, thermochromia, spraying, laser printing, stamping, electrostatic painting introduction of pigment into the body 450, or the like.

Although FIGS. 3 and 4a-d illustrate embodiments of a line 300 that is elongated and cylindrical, further embodiments can comprise a line 300 and/or pixel bodies 400 that have various suitable shapes, sizes and profiles. For example, in some embodiments, a line 300 can comprise a plurality of cuboid pixel bodies 400 as shown in FIGS. 5a and 5b respectively. In some embodiments, a line 300 can comprise a plurality of spherical or ovoid pixel bodies 400 as shown in FIGS. 5c and 5d respectively.

Additionally, a line 300 can comprise any suitable material, including nylon, acrylonitrile butadiene styrene (ABS plastic), a resin, a metal, ceramic, gypsum, and the like. In some preferred embodiments, a line 300 can comprise an extrudable thermoplastic polymer.

Figure 6:
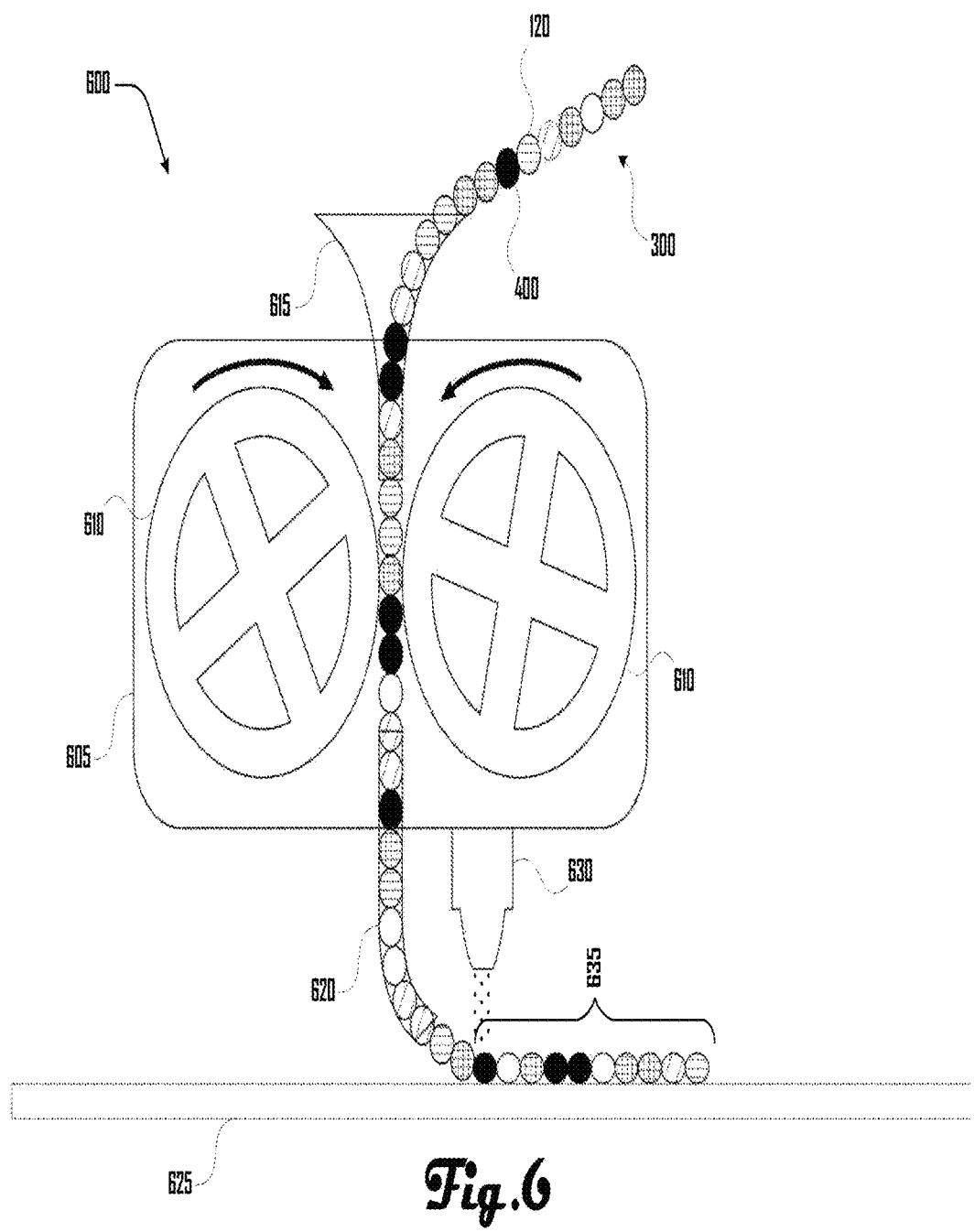
FIG. 6 illustrates a depositing module that comprises a pair of wheels disposed within a housing, which is configured to deposit a line on a substrate.

A line 300 comprising a plurality of pixel bodies 400 can be used to generate a colored object 100 (e.g., FIGS. 1a and 1b) in various suitable ways. For example, FIG. 6 illustrates a depositing module 600 that comprises a pair of wheels 610 disposed within a housing 605. The wheels 610 are configured to rotatably contact a line 300, which pulls the line 300 into a hopper 615 and urges the line 300 out a nozzle 620, where the line 300 is deposited on a substrate 625. The depositing module 600 can also comprise a heat element 630 that is configured to heat a portion of the line 300 that is leaving the nozzle 620, which can melt the pixel bodies 400 in this portion of the line 300. Such melting can result in flattening of deposited pixel bodies 635 and can cause the deposited pixel bodies 635 to be coupled with the substrate 625. The heat element 630 can generate and provide heat in various suitable ways including via a hot air blower, an electric heating coil, inductive heating, a laser, a light bulb, or the like.

In various embodiments, the line 300 can be heated via any suitable method such that the line 300 is extrudable (e.g., heated to a temperature where the line 300 is within a range of fluidity where the heated line 300 can be extruded in a desired way). Any suitable heated extrusion process can be used in various embodiments, including Fused Deposition Modeling (FDM), Fused Filament Fabrication (FFF), Plastic Jet Printing (PJP), or the like. However, these examples of three dimensional printing using heat should not be construed to be limiting on the scope of the present invention, and some embodiments can use any suitable cold or non-heated three dimensional printing method or technique.

In various embodiments, the housing 605 and/or substrate 625 can be configured to move in one or more dimension, which can facilitate selective deposition of pixel bodies 400 onto the substrate 625 and/or on pixel bodies 400 that are present on the substrate 625. In other words, the depositing module 600 can be used for additive manufacturing and/or three-dimensional (3D) printing applications to create three dimensional colored objects 100 like the cup illustrated in FIG. 1a and the doll's head illustrated in FIG. 1b. By selective deposition of pixel bodies 400, the depositing module 600 can generate a pixel array 115, which can generate an image 105 on the object 100 as shown in FIGS. 1a and 1b.

Figure 7:
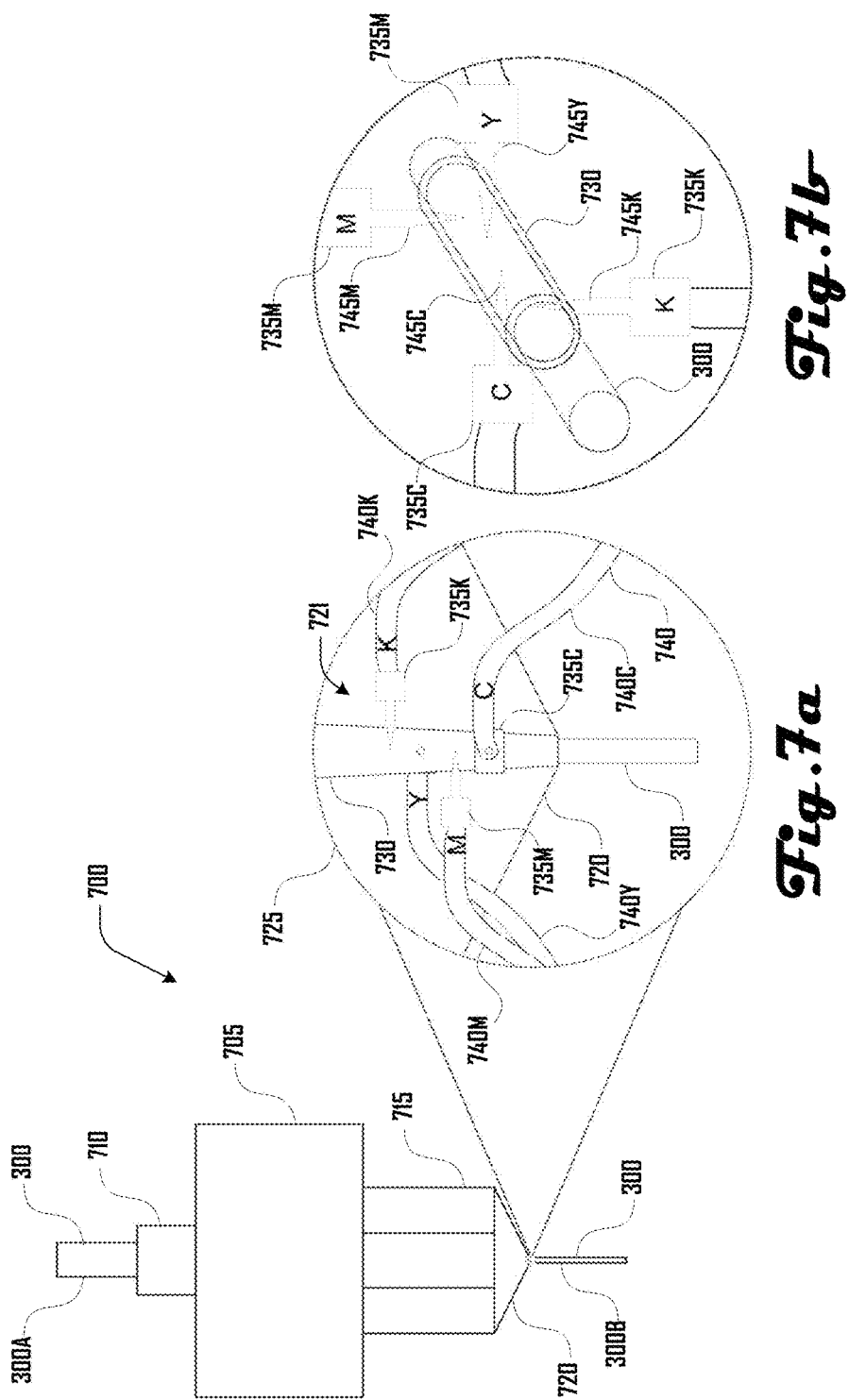

In some embodiments, a line 300 can be colored during an extrusion process. For example, FIG. 7a illustrates an embodiment of a line extruder 700 that comprises a housing 705 that includes a feeder 710 that feeds a feeder line 300A into the housing 705. The feeder line 300A passes through an extrusion head 715 and out a nozzle 720 as an extruded line 300B. In this example, the line 300 is modified as the line 300 passes through the extruder 700 to form the extruded line 300B.

The close-up view 725 of the nozzle 720 illustrates that the nozzle 720 can comprise an inkjet system 721 that is configured to color the line 300 and generate pixels 110 (see FIGS. 1a and 1b) in the line 300. In this example, the inkjet system 721 is configured for CMYK coloring and comprises ink feeders 740C, 740M, 740Y, 740K, which respectively feed cyan, magenta, yellow and black ink to respective injectors 735C, 735M, 735Y, 735K. As illustrated in FIG. 7b, the injectors 735 are configured to imprint the line 300 via respective injector heads 745C, 745M, 745Y, 745K while as the line 300 passes through a printing chamber 730.

In accordance with various embodiments, the feeder line 300A can be heated within the extruder housing 705 and molded into a narrower line 300 that is then colored via the inkjet system 721 as discussed above. In further embodiments, various other suitable systems can color or otherwise modify the line 300. For example, in some embodiments liquid or solid pigments (e.g., powder) can be introduced to the line 300 in the printing chamber 730. For example, such pigments can be introduced via spraying, rollers, or other suitable method.

Figure 8:
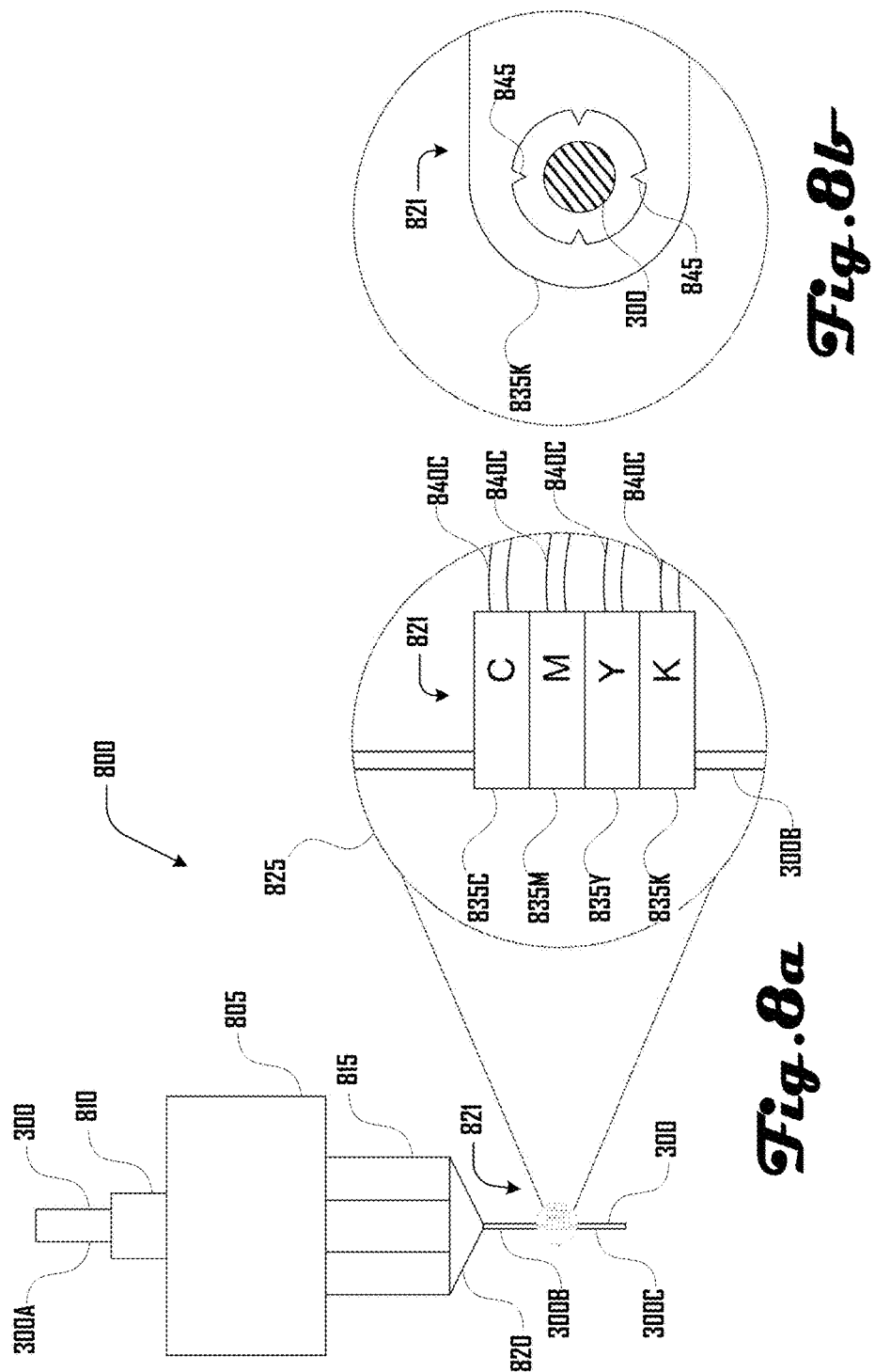

In some embodiments, a line 300 can be colored after an extrusion process. For example, FIG. 8a illustrates another embodiment of a line extruder 800 that comprises a housing 805 that includes a feeder 810 that feeds a feeder line 300A into the housing 805. The feeder line 300A passes through an extrusion head 815 and out a nozzle 820 as an extruded line 300B. In this example, the line 300 is modified as the line 300 passes through the extruder 800 to form the extruded line 300B. The extruded line then passes through an inkjet system 821 to generate a colored line 300C.

As shown in the close-up view 825, the inkjet system 821 can be configured to color the line 300 and generate pixels 110 (see FIGS. 1a and 1b) in the extruded line 300B. In this example, the inkjet system 821 is configured for CMYK coloring and comprises ink feeders 840C, 840M, 840Y, 840K, which respectively feed cyan, magenta, yellow and black ink to respective jets 835C, 835M, 835Y, 835K. The jets 835 are configured to imprint the line 300 via respective jet heads 845 as shown in FIG. 8b, which shows jet heads 845 of the black jet 835K in a close up view of the bottom of the black jet 835K.

As illustrated in FIGS. 7a and 8a, some embodiments can comprise hot extrusion of a line 300. Further embodiments can comprise cold extrusion or any other suitable process. Additionally, such extruders can be movably configured to position an extruded line on a substrate 625 (see FIG. 6), which may or may not also be configured to be movable. As discussed herein, by selectively depositing the extruded line 300 on a substrate 625 and/or on the line 300 that has already been deposited on the substrate 625, such extruders can be configured to generate three dimensional objects 100 (see FIGS. 1a and 1b) that comprise an image 105 defined by pixels 120 of a pixel matrix 115, which is defined by the deposited line 300.

Additionally, although ink jetting during and after extrusion is shown as some examples of coloring of a line 300, further embodiments can comprise mixing of powder or liquid pigments and the material being extruded (before, after, or during extrusion); inkjetting the extrusion after it has been extruded and after it has been deposited; feeding an extruder with suitable amounts of different colors of the line material in a sequence that coincides with the desired order of the string of colors; using permanent photochromic materials for the extrusion and applying different spectrums of light to portions of the extruded line 300 in order to obtain a desired color sequence; using permanent electrochromic materials for the extrusion and applying different electric discharges to portions of the extruded line 300 in order to obtain a desired color sequence; using permanent thermochromic materials for the extrusion and applying different temperatures to portions of the extruded line 300 in order to obtain a desired color sequence, and the like.

Figure 9:
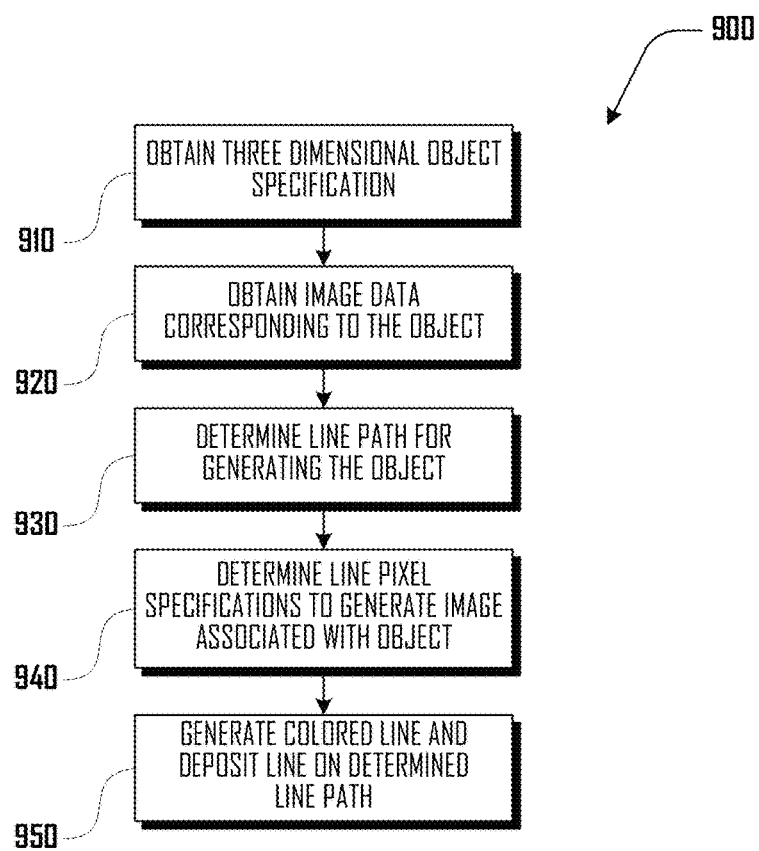
FIG. 9 is a flow diagram of a method for generating a three-dimensional object that comprises an image.

In addition to device hardware and materials that can be used to generate three-dimensional objects 100 that comprise images 105, further embodiments are directed to methods and software products for designing such objects 100 and driving various devices to generate such objects 100. For example, FIG. 9 is a flow diagram of a method 900 for generating a three-dimensional object 100 that comprises an image 105.

The method begins, in block 910, where a three dimensional object specification is obtained. For example, in some embodiments three-dimensional objects can be designed in a computer aided drawing (CAD) environment and their specifications can be stored in various suitable formats, including IGES (Initial Graphics Exchange Specification), JT (by Siemens PLM Software), Parasolid (by ShapeData/Siemens PLM Software), PRC (Product Representation Compact), STEP (International Organization for Standardization (ISO) #10303), Stereolithigraphy/Standard Tessellation Language (STL), Universal 3D (3D Industry Forum), VRML (Virtual Reality Modeling Language), and the like. Accordingly, in some embodiments, a user can generate a 3D image, whereas in other embodiments the user can obtain a specification for three dimensional objects from another source (e.g., downloading a file, 3D scanning, or the like).

In block 920, image data corresponding to the object is obtained. For example, such image data can be present in a file format described above or can be present in another format. As discussed above, users can generate their own images, or can obtain images from another source.

In one embodiment, a user can use a CAD program to design a three dimensional object and/or associate an image with a three dimensional object. For example, in some embodiments, a user can paint or otherwise color a three dimensional image. In another embodiment, a user can import an existing image and associate it with a three dimensional object. In other embodiments, a user can obtain and use existing object and image data.

In block 930, a line path is determined for generating the object. For example, in the field of additive manufacturing and 3D printing, it may be necessary to convert data related to a three dimensional object into instructions for printing or additively making the subject three dimensional object. For example, in the case of cold or hot extrusion of a line 300 of material, a path can be generated that a nozzle 620, 720, 820 (see FIGS. 6, 7a, 7b and 8a) can travel relative to a substrate 625 (see FIG. 6), or the like, to generate the three dimensional object with the line 300. In other words, a determination can be made where the line 300 will be deposited on the substrate 625 and/or on material that has already been deposited on the substrate (e.g., extruded line 300, or other material). In various embodiments, such a conversion may comprise a conversion from a 3D CAD format (e.g., as discussed above) to G-code (designed by Massachusetts Institute of Technology), STEP-NC (ISO #10303, #10303-238 and #14649), or any other suitable numerical control (NC) programming language.

In various embodiments, a line path can comprise a plurality of horizontal slices or layers that additively generate a three-dimensional object. However, in further embodiments, line paths can be any suitable form, including vertical slices, slices in a plurality of directions or angles, or the like. Line paths can be substantially contiguous for an entire three dimensional object or can comprise one or more portions where deposition of a line 300 stops at one position and then begins again at another position.

In block 940, line pixel specifications are generated that will create the image associated with the three dimensional object. For example, in addition to determining where the line 300 will be deposited to physically generate the three dimensional object, a determination can be made regarding pigmentation of the line 300 so that when the line 300 is deposited, the line 300 generates a pixel array 115 (see FIGS. 1a and 1b) defined by adjoining pixels 110 of the line 300, such that the pixel array 115 generates a desired image 105.

In various embodiments, designing the line 300 can comprise determining a pigmentation or coloring for each pixel of a line 300 that will form an object. In some embodiments, such a design can be based on the width or diameter of the line 300, the anticipated width or diameter of the line 300 once deposited, the material comprising the line 300, and the like. In some embodiments, designing a line 300 can comprise selecting a pixel color, a pixel pigmentation, a pixel additive, a pixel texture, a pixel opacity, a pixel length, a pixel width, a line width, a pixel shape, a line shape, a pixel material, and the like.

In some embodiments, it can be beneficial to identify portions of the line 300 that will be on the external portion (including holes, cavities, pores, and the like, in some embodiments) of the object and only selectively color or pigment such portions of the line 300 because internal portions of the line 300 and object may not be observable if the external portion of the object is substantially opaque. This may be beneficial because coloring and/or pigmenting material can be saved for portions of the object that will be externally viewable.

However, in some embodiments, portions of the line 300 and object can be transparent and/or translucent, and it can be beneficial to color or pigment portions of the object that are not external portions. For example, in some embodiments, it can be desirable to pigment or color internal portions of an object such that it looks like solid objects are suspended within the object (e.g., like a spider preserved in amber), to generate a layered image, to have an internal image layer that is protected, or the like.

In such embodiments where portions of the line 300 are colored and where other portions of the line 300 are not colored as described above, it may be desirable to determine a line path (see e.g., block 930 in FIG. 9) where colored portions are deposited in groups that are as contiguous and as long as possible. This may be desirable for improving the accuracy and quality of a resulting image.

Figure 10A:
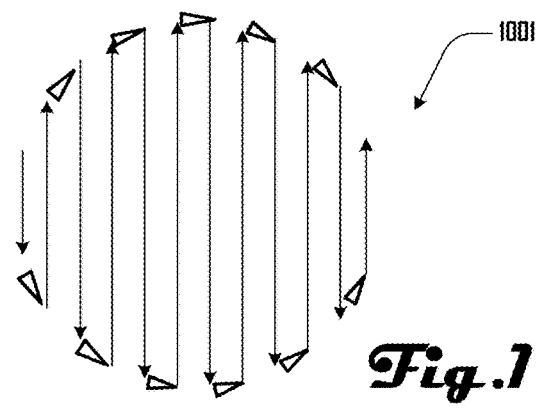
FIGS. 10a-c illustrate respective example line paths that can be used to generate a circular layer in accordance with various embodiments.
Figure 10B:
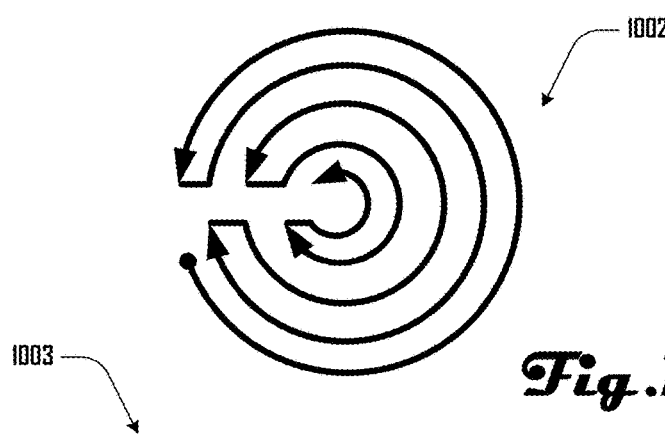
Figure 10C:
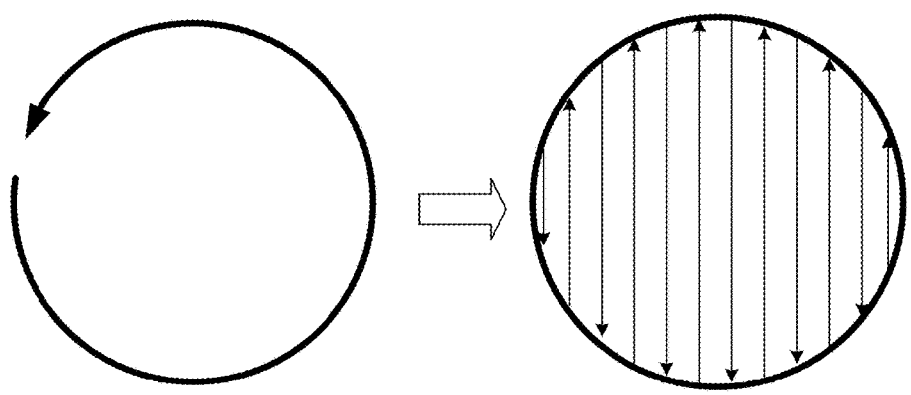

For example, referring to FIGS. 10a-c, there are various ways that a layer or slice of a three dimensional object (in this example a circle) can be generated. FIG. 10a illustrates an example deposit path 1001 where a circle is generated by depositing a plurality of vertical columns of varying lengths until a circle is formed. In such an embodiment, if only the external portions of the circle are colored and internal portions are not colored, then such colored portions will only be small portions at the beginning and end of each vertical column. Accordingly, such a line path may not be desirable in some embodiments.

In contrast, FIGS. 10b and 10c illustrate embodiments of line paths 1002, 1003, where the outer perimeter of the circle can be deposited first (or last). For example FIG. 10b illustrates a path 1002 where the outer portion of the circle is deposited first and then the internal portion of the circle is deposited via increasingly smaller concentric circles deposited therein. In an alternative embodiment, the internal concentric circles can be formed first and the external portions of the circle can be deposited last.

Similarly, FIG. 10c illustrates a path 1003 where the outer portion of the circle is deposited first and then the internal portion of the circle is deposited via a plurality of parallel lines. In an alternative embodiment, the internal parallel lines can be formed first and the external portions of the circle can be deposited last.

For such paths as illustrated in FIGS. 10b and 10c, and where only the external portions of the circle are being colored and the internal portion are not being colored, such line paths 1002, 1003 deposit all of the color line first (or last in alternative embodiments) and then deposit non-colored internal line last (or first in alternative embodiments). As discussed above, this can be desirable in some embodiments.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A three-dimensional printing system for creating an extrusion within a three-dimensional printer for use in printing a three-dimensional object, comprising:
    an extruder of the three-dimensional printer that comprises a housing and is configured to receive a filament;
    a feeder coupled to the housing for supplying the filament to the housing of the extruder; and
    an injector for injecting colored dye into the filament received from the housing of the extruder,
    wherein the filament comprises an elongated line of pixels.

2. The three-dimensional printing system of claim 1, wherein the extruder is configured to receive the filament and increase the temperature of the filament to a temperature where the filament is extrudable via an extruder head of the extruder.

3. The three-dimensional printing system of claim 1, wherein the injector is configured to inject colored dye into the filament via an inkjet printing procedure.

4. The three-dimensional printing system of claim 1, wherein the extruder system is configured to deposit the filament to generate a three dimensional object having an image defined by a pixel array that is defined by the pixels of the line.

* * * * *